(12) United States Patent
Park

(10) Patent No.: US 12,533,974 B2
(45) Date of Patent: Jan. 27, 2026

(54) CHARGE PORT DOOR

(71) Applicant: SL Corporation, Daegu (KR)

(72) Inventor: Minha Park, Gyeongsan-si (KR)

(73) Assignee: SL Corporation, Daegu (KR)

( * ) Notice: Subject to any disclaimer, the term of this patent is extended or adjusted under 35 U.S.C. 154(b) by 502 days.

(21) Appl. No.: 17/990,878

(22) Filed: Nov. 21, 2022

(65) Prior Publication Data

US 2023/0184025 A1     Jun. 15, 2023

(30) Foreign Application Priority Data

Dec. 10, 2021    (KR) .................. 10-2021-0176222

(51) Int. Cl.
    *B60L 53/16*        (2019.01)

(52) U.S. Cl.
    CPC .......... *B60L 53/16* (2019.02); *E05Y 2400/445* (2013.01); *E05Y 2400/854* (2013.01); *E05Y 2900/534* (2013.01)

(58) Field of Classification Search
    CPC .......... E05F 15/75; B60L 53/16; E05B 83/34; E05B 81/64; E05Y 2400/445; E05Y 2400/854; E05Y 2900/534; E05Y 2900/132
    USPC ................................................. 296/97.22
    See application file for complete search history.

(56) References Cited

U.S. PATENT DOCUMENTS

| | | | |
|---|---|---|---|
| 11,419,434 B1 * | 8/2022 | Artwohl | F25D 23/028 |
| 2013/0074985 A1 * | 3/2013 | Ferguson | F01M 11/0458 |
| | | | 141/98 |
| 2013/0326955 A1 * | 12/2013 | Kotama | E05F 15/40 |
| | | | 49/13 |
| 2014/0339834 A1 * | 11/2014 | Alexander | E05C 19/022 |
| | | | 292/96 |
| 2015/0114052 A1 * | 4/2015 | Kitamura | E05B 65/00 |
| | | | 70/277 |
| 2020/0318399 A1 | 10/2020 | Ueki | |
| 2022/0090432 A1 * | 3/2022 | Yoon | E05F 15/43 |

FOREIGN PATENT DOCUMENTS

| | | | | | |
|---|---|---|---|---|---|
| BR | 102017022377 A2 | * | 6/2018 | ............ | B60K 15/05 |
| CN | 102656044 A | * | 9/2012 | ............ | B60K 15/05 |
| CN | 101918239 B | * | 10/2013 | ............ | B60K 15/05 |
| CN | 106917556 A | * | 7/2017 | ............... | E05F 5/02 |
| CN | 206581744 U | * | 10/2017 | | |
| CN | 206581747 U | * | 10/2017 | | |
| CN | 109286096 A | | 1/2019 | | |
| CN | 109760754 A | | 5/2019 | | |
| CN | 109624699 B | * | 9/2020 | ............ | B60K 15/05 |
| CN | 114450184 A | * | 5/2022 | ............ | B62D 25/24 |

(Continued)

*Primary Examiner* — Hilary L Gutman
(74) *Attorney, Agent, or Firm* — United One Law Group LLC; Kongsik Kim; Jhongwoo Peck

(57) ABSTRACT

A door for a charging port of a vehicle includes a switch that transmits a control signal, a housing rim that is fixed to the vehicle and accommodates the switch, a door panel configured to open or close the housing rim based on the control signal, a spring that applies a pushing force to the door panel with respect to the housing rim, and a spring cover configured to be seated on the housing rim, accommodating the spring. When the door panel is moved toward the housing rim by an external pressure, the switch is operated.

10 Claims, 16 Drawing Sheets

(56) References Cited

FOREIGN PATENT DOCUMENTS

| | | | | | |
|---|---|---|---|---|---|
| CN | 116238356 | A | * | 6/2023 | ............. B60K 15/05 |
| CN | 116641625 | A | * | 8/2023 | ............. B60L 53/16 |
| DE | 102014106846 | A1 | * | 11/2014 | ............. B60K 15/05 |
| JP | 2012064504 | A | * | 3/2012 | ............. B60L 11/14 |
| JP | 2012240645 | A | * | 12/2012 | ............. B60K 15/05 |
| JP | 2024131781 | A | * | 9/2024 | |
| KR | 200473509 | Y1 | * | 7/2014 | |
| WO | WO-2005077699 | A1 | * | 8/2005 | ............. B60K 15/05 |

* cited by examiner

CHARGE PORT DOOR

CROSS-REFERENCE TO RELATED APPLICATION(S)

This application claims priority from Korean Patent Application No. 10-2021-0176222, filed on Dec. 10, 2021, which is incorporated herein by reference in its entirety.

BACKGROUND

1. Technical Field

The present disclosure relates to a charging port door, and more particularly, to a door for a charging port that can be opened and closed by applying an external pressure.

2. Description of the Related Art

An electric vehicle or hybrid vehicle, in which a motor and a battery are provided to generate a driving force with electric power, is provided with a charging port for charging the battery. A vehicle other than an electric vehicle or a hybrid vehicle may also have a charging port for various equipment or for charging a battery.

The charging port may be provided on a side of the vehicle, and may be sealed by the charging port door. When the charging port door is opened, the charging port may be exposed to the exterior, and when the charging port door is closed, the charging port may be protected from the external elements.

SUMMARY

An object of the present disclosure is to provide a charging port door that can be opened and closed by external pressure.

According to an aspect of the present disclosure, a door for a charging port of a vehicle may include a switch that transmits a control signal, a housing rim that is fixed to the vehicle and accommodates the switch, a door panel configured to open or close the housing rim based on the control signal, a spring that applies a pushing force to the door panel with respect to the housing rim, and a spring cover configured to be seated on the housing rim, accommodating the spring therein. The door panel may be moved toward the housing rim by an external pressure to operate the switch.

In some embodiments, the charging port door may further include a trigger coupled to the spring cover and configured to move relative to the spring cover by the external pressure applied to the door panel to press the switch. The spring cover and the trigger may be engaged with each other to restrict a movement range of the door panel.

The housing rim may include an upper housing rim disposed toward the door panel, and a lower housing rim coupled to the upper housing rim to provide an accommodation space for the switch. The upper housing rim may include a housing aperture to allow movement of a stud provided in the trigger therethrough. The charging port door may further include a sealing member made of a material deformable by a pressure applied via the stud such that the sealing member may seal the housing aperture. The spring cover may be seated on a seating surface formed by the upper housing rim and the sealing member. More particularly, a surface of the sealing member and a surface of the upper housing rim may be disposed on a same virtual surface, and the seating surface may include a portion of the virtual surface including the surface of the sealing member.

In some embodiments, the charging port door may further include a pressure delivering member disposed between the sealing member and the switch to transmit the pressure from the stud to the switch.

In some embodiments, the door panel may include an outer panel for receiving an external pressure, and an inner panel disposed toward the housing rim and coupled to the outer panel. Further, the spring cover may be movable with respect to the inner panel. A stud may be provided on the outer panel such that the stud may press the switch in response to the outer panel and the inner panel moving with respect to the spring cover by the external pressure.

The switch may transmit an open signal and a close signal alternatingly each time it is operated.

The charging port door according to embodiments of the present disclosure as described herein may provide an advantage in that the user can easily open and close the charging port door since it is possible to open and close the charging port door by external pressure. In addition, there is an advantage in that the amount of pressure required to open and close the charging port door is constantly maintained even if the opening and closing of the charging port door is performed a plurality of times.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
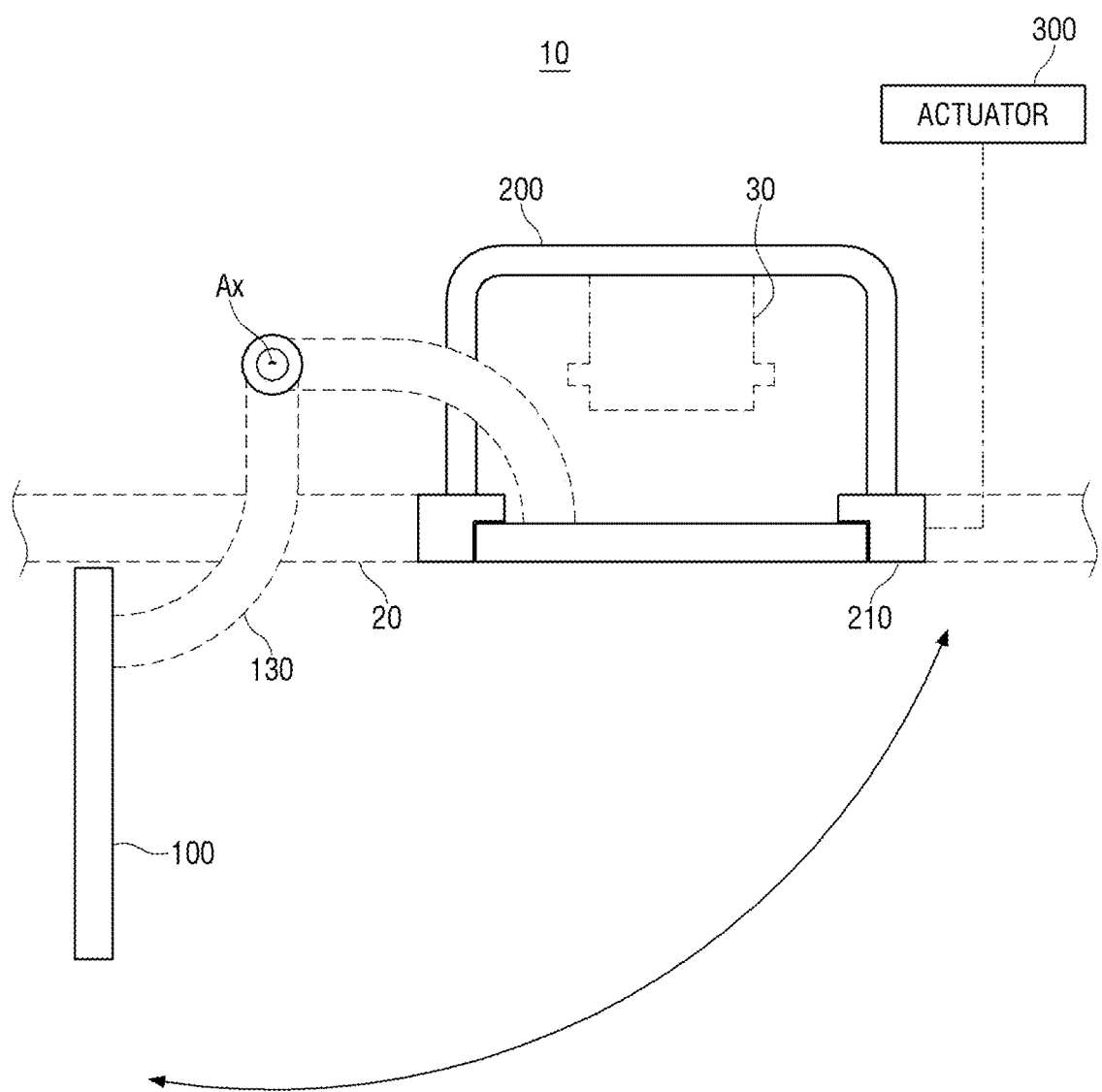
FIG. 1 is a view showing a charging port door according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, exemplary embodiments for the charging port door according to the present disclosure will be described with reference to the drawings.

FIG. 1 is a view showing a charging port door according to an embodiment of the present disclosure. Referring to FIG. 1, a charging port door 10 according to an embodiment of the present disclosure may include a door panel 100, a charging housing 200, and an actuator 300.

The door panel 100 may open and close the charging housing 200 that accommodates the charging port 30 therein. The vehicle 20 may be provided with a charging port 30 for charging a battery (not shown). For example, an electric vehicle or a hybrid vehicle may include a charging port 30 for charging a battery. For a non-electric vehicle or a non-hybrid vehicle, a charging port 30 may still be provided for operation of mounted equipment or charging a battery.

A charging housing 200 that accommodates the charging port 30 may be provided on a side of the vehicle 20, and the door panel 100 may open and close the charging housing 200. When the door panel 100 opens the charging housing 200, the charging port 30 may be exposed to the exterior, and when the door panel 100 closes the charging housing 200, the charging port 30 may be sealed in the charging housing 200.

For the opening and closing operation of the door panel 100, a support arm 130 may be coupled to the door panel 100. One end of the support arm 130 may be rotatably coupled to the vehicle 20, and the other end may be coupled to the door panel 100. The door panel 100 may be rotated with respect to the rotation axis Ax of the support arm 130 to open or close the charging housing 200.

A housing rim 210 may be provided at a distal end of the charging housing 200. The housing rim 210 may be provided to surround the opening of the charging housing 200. When the door panel 100 opens the charging housing 200, the door panel 100 may be detached from the housing rim 210, and when the door panel 100 closes the charging housing 200, the door panel 100 may abut the housing rim 210.

The actuator 300 may perform an operation for opening or closing the charging housing 200. For example, the actuator 300 may be implemented in the form of a driving motor. More specifically, the actuator 300 may rotate the door panel 100 with a driving force to open or close the charging housing 200. In some embodiments, the actuator 300 may be implemented in the form of a locking device. In this case, the actuator 300 may release a lock to enable the rotation of the door panel 100 or may lock the door panel 100 to prevent the rotation. When the lock is released, a user may manually rotate the door panel 100 to open the charging housing 200.

The housing rim 210 may transmit a control signal to the actuator 300. The actuator 300 may operate based on the control signal received from the housing rim 210. The housing rim 210 may receive a user command through the door panel 100 and transmit a control signal to the actuator 300 accordingly. As will be described later below, when an external pressure is applied to the door panel 100, the housing rim 210 may transmit a control signal.

Figure 2:
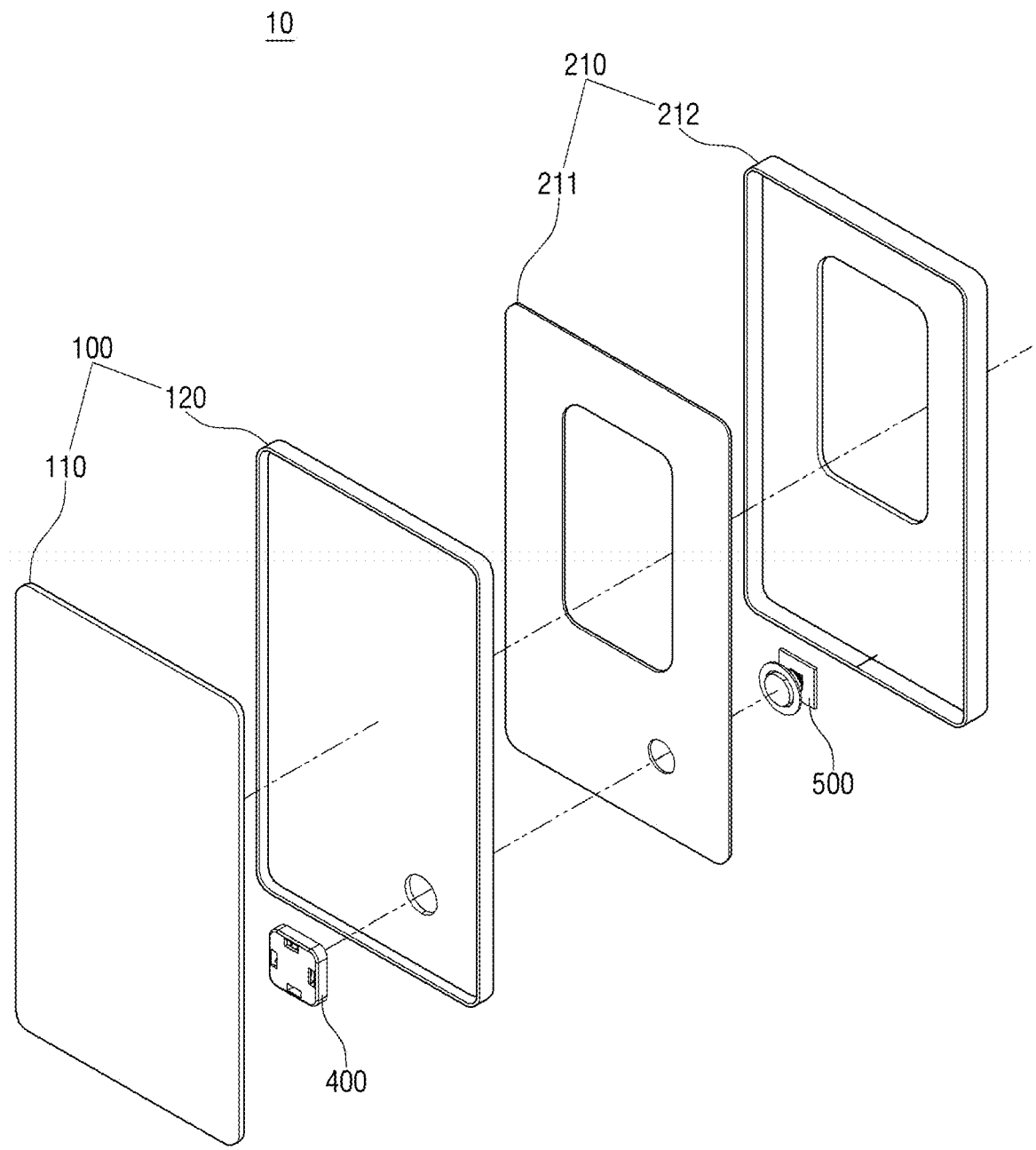
FIG. 2 is an exploded perspective view of a charging port door according to an embodiment of the present disclosure.

FIG. 2 is an exploded perspective view of a charging port door according to an embodiment of the present disclosure. Referring to FIG. 2, the charging port door 10 according to the embodiment of the present disclosure may include a door panel 100, a trigger unit 400, a housing rim 210, and a switch unit 500.

The door panel 100 may include an outer panel 110 and an inner panel 120. The outer panel 110 may receive the external pressure. For example, the user may input a user command by pushing the outer panel 110 with the external pressure.

The inner panel 120 may be disposed toward the housing rim 210 and may be coupled to the outer panel 110. The outer panel 110 and the inner panel 120 may be coupled to each other to be manipulated together.

The trigger unit 400 may provide pressure to the switch unit 500. In the present disclosure, the door panel 100 may open or close the housing rim 210 by a control signal, and the door panel 100 may move toward the housing rim 210 by the external pressure to activate the switch 530 provided in the switch unit 500. The trigger unit 400 may provide the pressure to the switch unit 500 by the movement of the door panel 100.

The housing rim 210 may be fixed to the vehicle 20 and accommodate the switch unit 500. As will be described later below, the switch unit 500 may include a switch 530 for transmitting a control signal. The housing rim 210 may include an upper housing rim 211 and a lower housing rim 212. The upper housing rim 211 may be disposed toward the door panel 100, and the lower housing rim 212 may be coupled to the upper housing rim 211 to provide an accommodation space for the switch 530.

Hereinafter, detailed structures and functions of the parts provided in the charging port door 10 will be described with reference to FIGS. 3 to 14.

Figure 3:
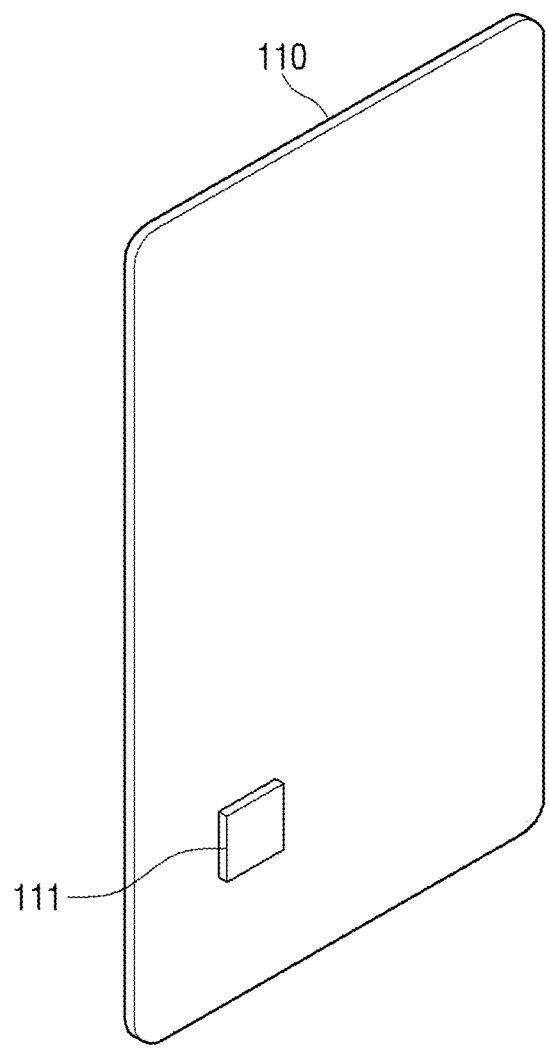
FIG. 3 is a rear perspective view of the outer panel.

FIG. 3 is a rear perspective view of the outer panel. Referring to FIG. 3, the outer panel 110 may include a protrusion portion 111. The protrusion portion 111 may protrude from the surface of the outer panel 110 toward the trigger unit 400, at a location that corresponds to the trigger unit 400. When the external pressure is applied to the outer panel 110, the protrusion portion 111 may transmit the pressure to the trigger unit 400.

Figure 4:
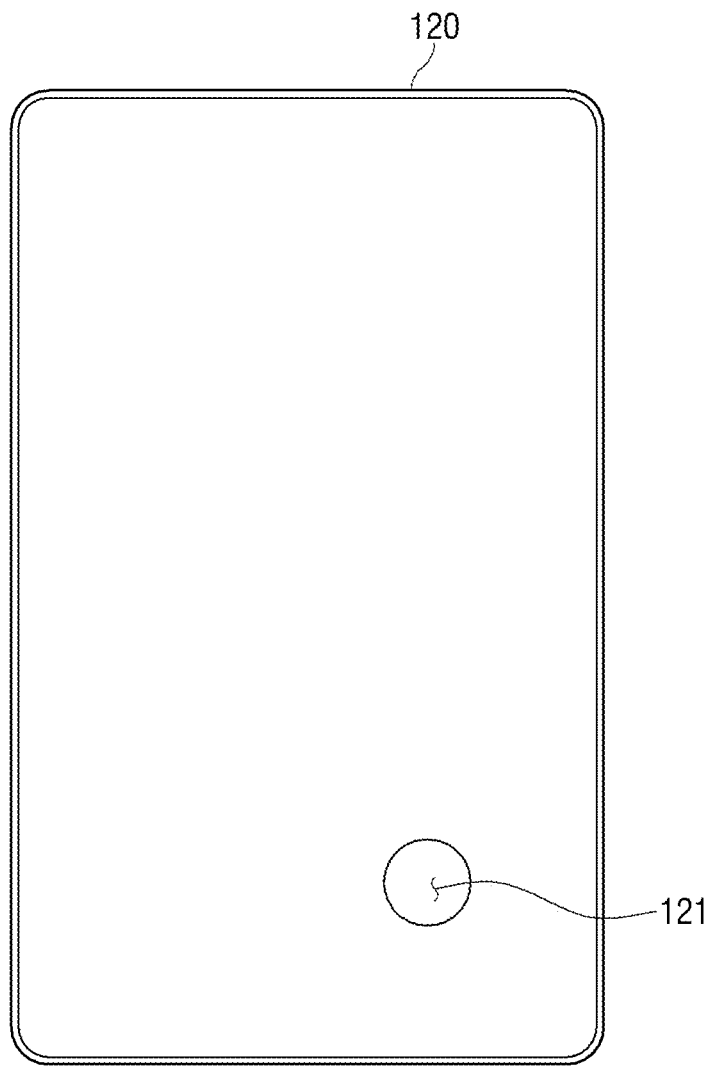
FIG. 4 is a front view of the inner panel.

FIG. 4 is a front view of the inner panel. Referring to FIG. 4, the inner panel 120 may include a panel aperture 121. Through the panel aperture 121, a spring cover 430 (see FIG. 6) provided in the trigger unit 400 may be inserted. A portion of the spring cover 430 may be accommodated in the door panel 100, and the remaining portion may be exposed to the outside through the panel aperture 121.

Figure 5:
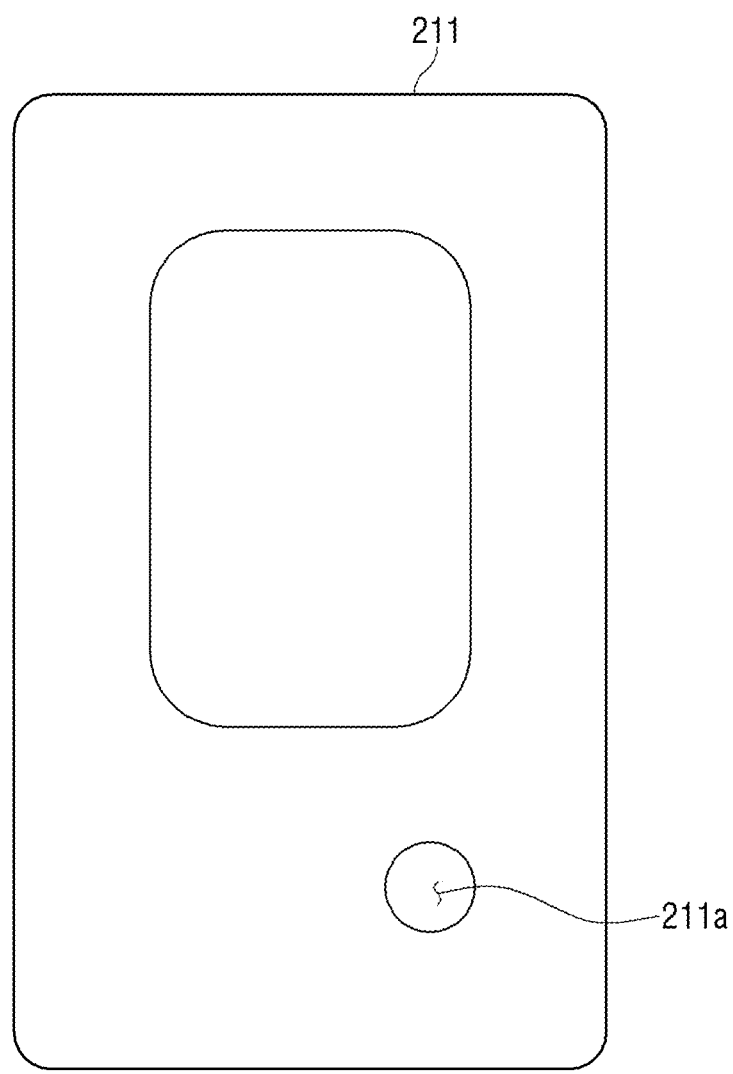
FIG. 5 is a front view of the upper housing rim.

FIG. 5 is a front view of the upper housing rim. Referring to FIG. 5, the upper housing rim 211 may include a housing aperture 211a. The housing aperture 211a may be provided to allow the movement of a stud 413 provided in the trigger 410 (see FIG. 7). When no external pressure is applied to the door panel 100, the stud 413 of the trigger 410 may not penetrate the housing aperture 211a. On the other hand, when an external pressure is applied to the door panel 100, the stud 413 of the trigger 410 may penetrate the housing aperture 211a to provide the pressure to the switch unit 500.

Figure 6:
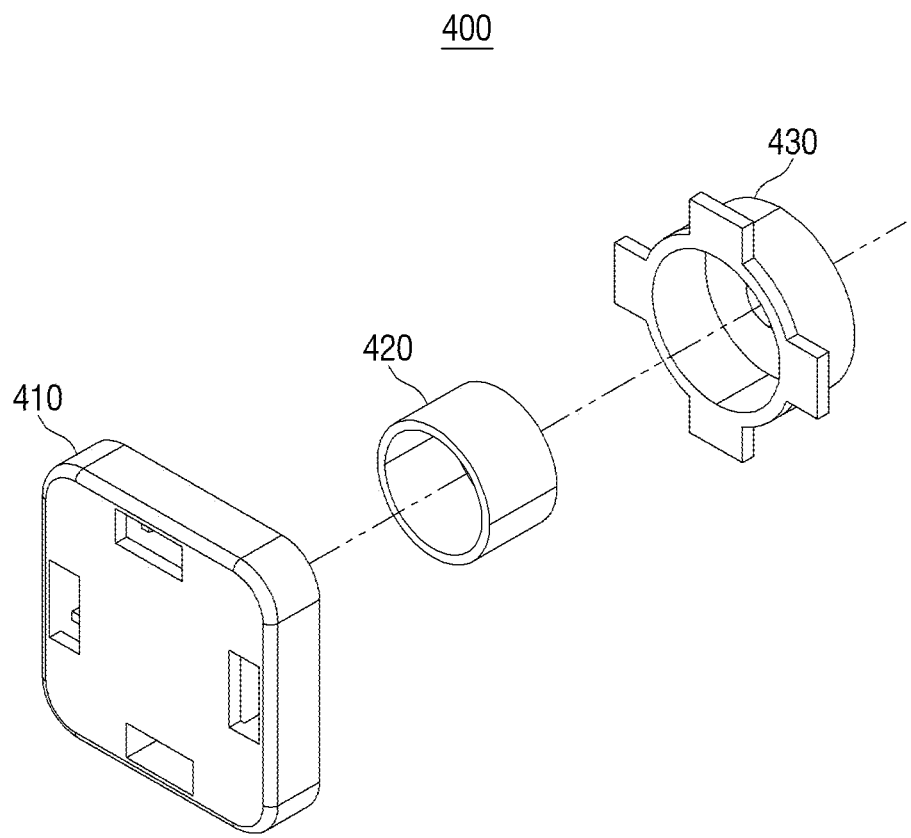
FIG. 6 is an exploded perspective view of the trigger unit.
Figure 7:
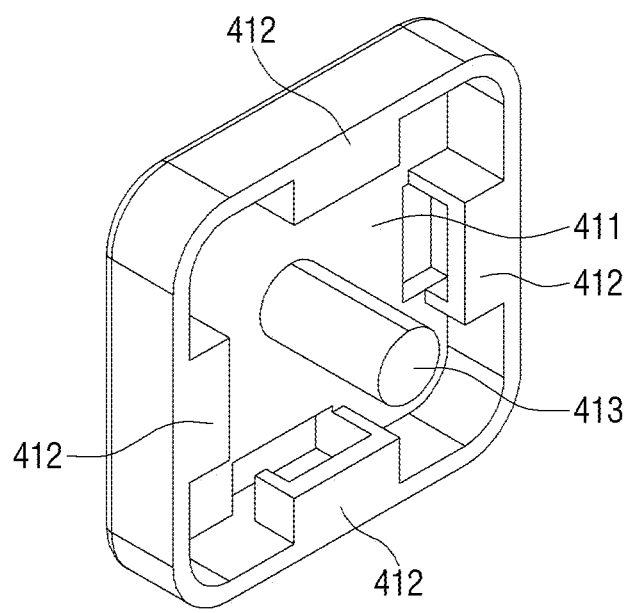
FIG. 7 is a rear perspective view of the trigger.
Figure 8:
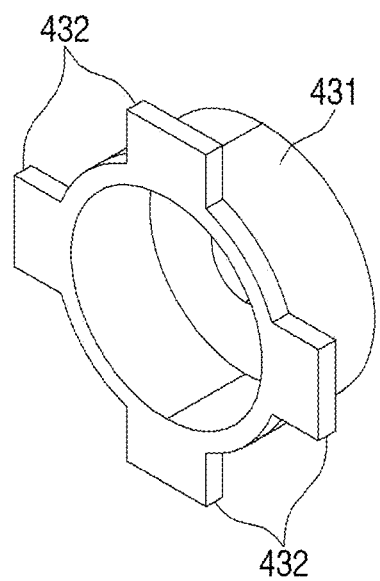
FIG. 8 is a perspective view of the spring cover.
Figure 9:
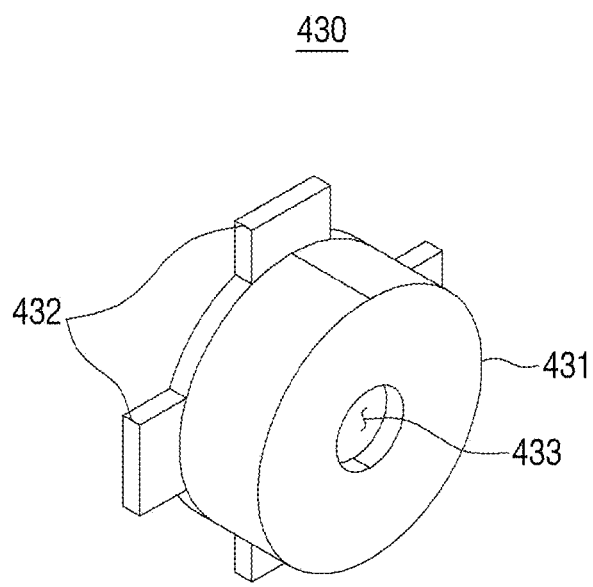
FIG. 9 is a rear perspective view of the spring cover.
Figure 10:
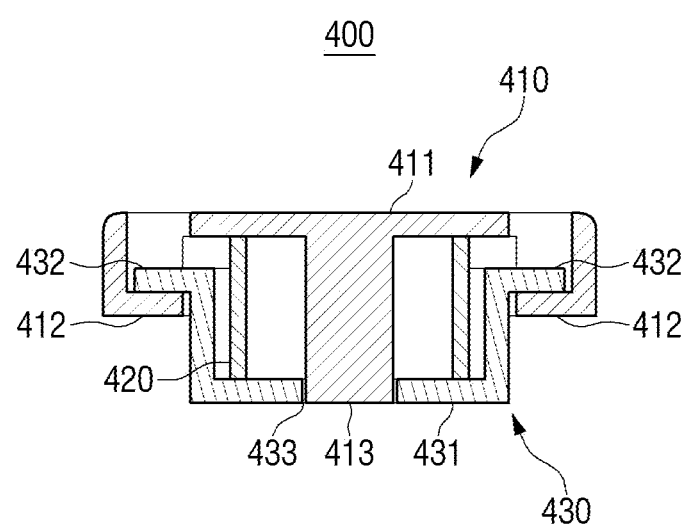
FIG. 10 is a view showing a trigger unit, in which the spring is expanded.
Figure 11:
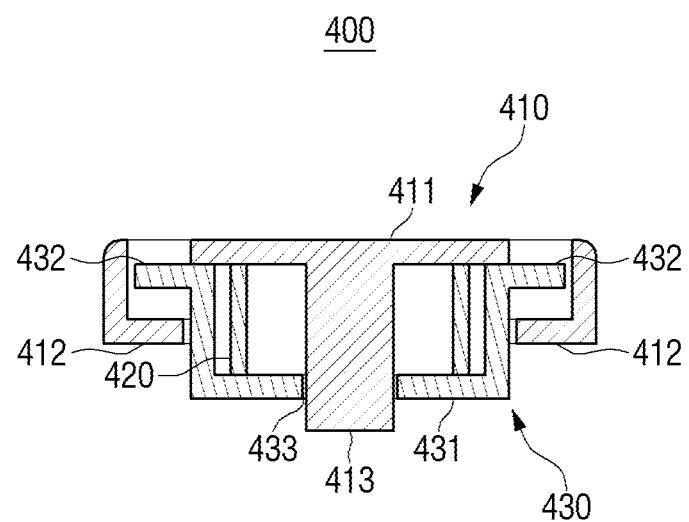
FIG. 11 is a view showing a trigger unit, in which the spring is compressed.

FIG. 6 is an exploded perspective view of the trigger unit 400, FIG. 7 is a rear perspective view of the trigger 410, FIG. 8 is a perspective view of the spring cover 430, FIG. 9 is a rear perspective view of the spring cover 430, FIG. 10 is a cross-sectional view showing the trigger unit 400, in which the spring is expanded, and FIG. 11 is a cross-sectional view showing the trigger unit 400, in which the spring is compressed. Referring to FIGS. 6 to 11, the trigger unit 400 may include a trigger 410, a spring 420, and a spring cover 430.

The trigger 410 may be coupled to the spring cover 430, and may move with respect to the spring cover 430 by the pressure applied to the door panel 100, thereby to press the switch 530 provided in the switch unit 500. When an external pressure is applied to the door panel 100, the trigger 410 may transmit the pressure to the switch unit 500 while moving by the pressure applied to the door panel 100. The trigger 410 may include a trigger body 411, a locking member 412 and a stud 413. The trigger body 411 may be provided in the shape of a plate to be in close contact with the door panel 100. The trigger body 411 may receive the pressure input from the door panel 100.

The locking member 412 may be formed on an edge of the trigger body 411. The locking member 412 may be engaged with a locking protrusion 432 of the spring cover 430.

The stud 413 may protrude from the trigger body 411 to provide the pressure to the switch unit 500. When the trigger 410 is moved by the door panel 100, the stud 413 may transmit the pressure to the switch unit 500.

The spring cover 430 may be seated on the housing rim 210 and accommodate the spring 420. The spring cover 430 may be engaged with the trigger 410, and the spring 420 may be accommodated in an accommodation space formed by the coupling of the spring cover 430 and the trigger 410. The spring cover 430 may include a cover body 431 and a locking protrusion 432. The cover body 431 may provide an accommodation space for accommodating the spring 420. A cover aperture 433 may be formed in the cover body 431 to allow the stud 413 of the trigger 410 to penetrate therethrough. The stud 413 may penetrate the cover aperture 433 to provide the pressure to the switch unit 500.

The locking protrusion 432 may be engaged with the locking member 412 provided on the trigger 410. In the present disclosure, the spring cover 430 and the trigger 410 may be engaged to restrict the movement range of the door panel 100. The spring cover 430 and the trigger 410 may be coupled to be movable with respect to each other.

FIG. 10 shows the arrangement of the trigger 410 and the spring cover 430 when the spring 420 is expanded (e.g., uncompressed), and FIG. 11 shows the arrangement of the trigger 410 and the spring cover 430 when the spring 420 is compressed.

When no external pressure is applied to the door panel 100, the elastic force of the spring 420 may act as a force to push the trigger 410 away from the spring cover 430. Since the locking protrusion 432 of the spring cover 430 is engaged with the locking member 412 of the trigger 410 as shown in FIG. 10, the spring cover 430 and the trigger 410 may not be completely separated.

When an external pressure greater than the elastic resistance force of the spring 420 is applied to the door panel 100, the trigger 410 may move toward the spring cover 430 as shown in FIG. 11. When the trigger body 411 of the trigger 410 abuts the cover body 431 of the spring cover 430, further movement of the trigger 410 with respect to the spring cover 430 may be limited.

The movement range of the door panel 100 may be determined as a range between the position of the trigger 410 with respect to the spring cover 430 shown in FIG. 10 and the position of the trigger 410 with respect to the spring cover 430 shown in FIG. 11. Hereinafter, the state of the charging port door 10, in which the spring 420 is expanded, as shown in FIG. 10 is referred to as an uncompressed state, and the state of the charging port door 10, in which the spring 420 is contracted by the external pressure, as shown in FIG. 11 is referred to as a compressed state.

The spring 420 may apply a pushing force to the door panel 100 with respect to the housing rim 210. The spring cover 430 may be seated on the housing rim 210, and the trigger 410 may abut the door panel 100. The elastic force of the spring 420 may cause the spring cover 430 and the trigger 410 to be pushed in opposite directions, and the elastic force of the spring 420 may push the door panel 100 with respect to the housing rim 210.

Figure 12:
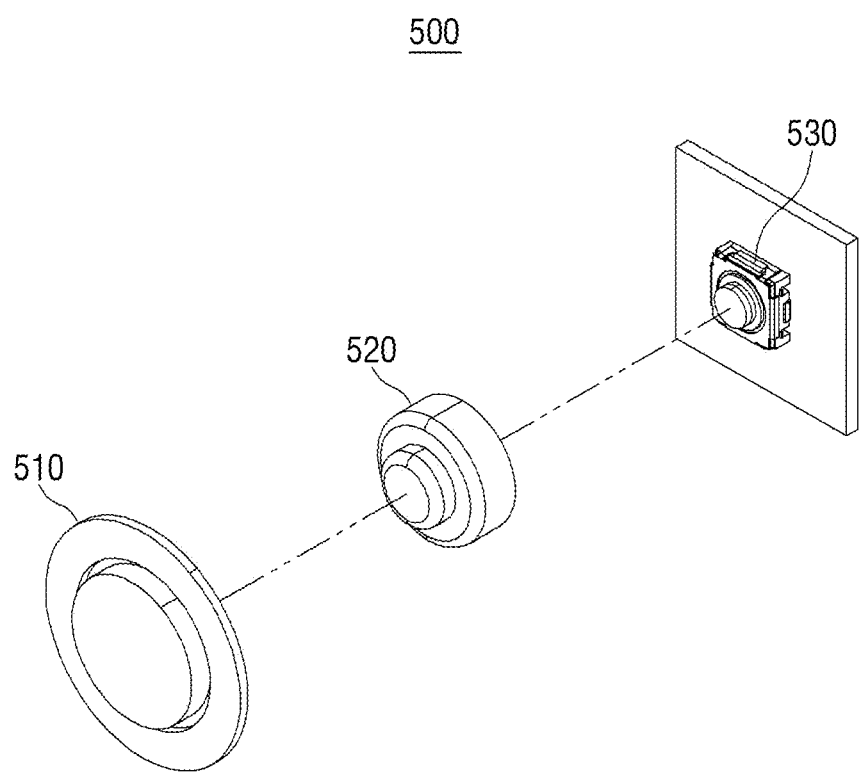
FIG. 12 is an exploded perspective view of a switch unit.

FIG. 12 is an exploded perspective view of a switch unit. Referring to FIG. 12, the switch unit 500 may include a sealing member 510, a pressure delivering member 520, and a switch 530.

The sealing member 510 may include a material deformable by the pressure applied from the stud 413 provided in the trigger 410, and may seal the housing aperture 211a. As described above, the upper housing rim 211 may include the housing aperture 211a, and the housing aperture 211a may be sealed by the sealing member 510. Due to the sealing member 510, foreign substances may be prevented from entering the interior space of the housing rim 210, and the inside of the housing rim 210 may be prevented from being visible from the outside. By way of example, the deformable material for the sealing member 510 may include silicone, rubber, or the like. However, the present disclosure is not limited thereto.

The pressure delivering member 520 may be disposed between the sealing member 510 and the switch 530, and may serve to deliver the pressure from the stud 413 provided in the trigger 410 to the switch 530. In some embodiments, the switch 530 may be disposed sufficiently proximate to the sealing member 510 to receive the pressure from the stud 413 directly, and the pressure delivering member 520 may be omitted.

The switch 530 may transmit a control signal for operating the actuator 300. More particularly, when the pressure is delivered through the pressure delivering member 520, the switch 530 may transmit a control signal. In the present disclosure, the switch 530 may alternately transmit an open signal and a closed signal each time it is operated (e.g., pressed). For example, when the switch 530 is operated by a first external pressure, it may transmit an open signal, and then when the switch 530 is operated by s second external pressure, a closing signal may be transmitted. Subsequently, when the switch 530 is operated by a third external pressure, an open signal may be transmitted.

When the open signal is transmitted, the actuator 300 may perform an operation for opening the charging housing 200, and when the closing signal is transmitted, the actuator 300 may perform an operation for closing the charging housing 200. For example, in response to the open signal, the actuator 300 may rotate the door panel 100 with a driving force to open the charging housing 200, and in response to the closing signal, the actuator 300 may rotate the door panel 100 with a driving force to close the charging housing 200.

Figure 13:
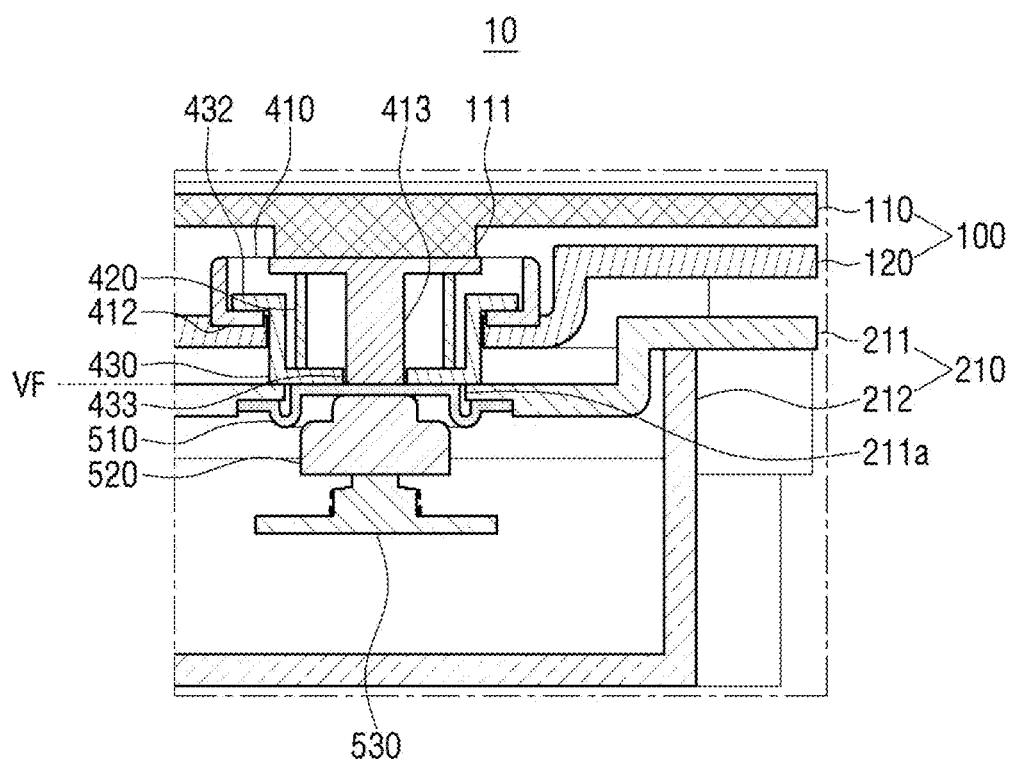
FIG. 13 is a view showing a charging port door in an uncompressed state.
Figure 14:
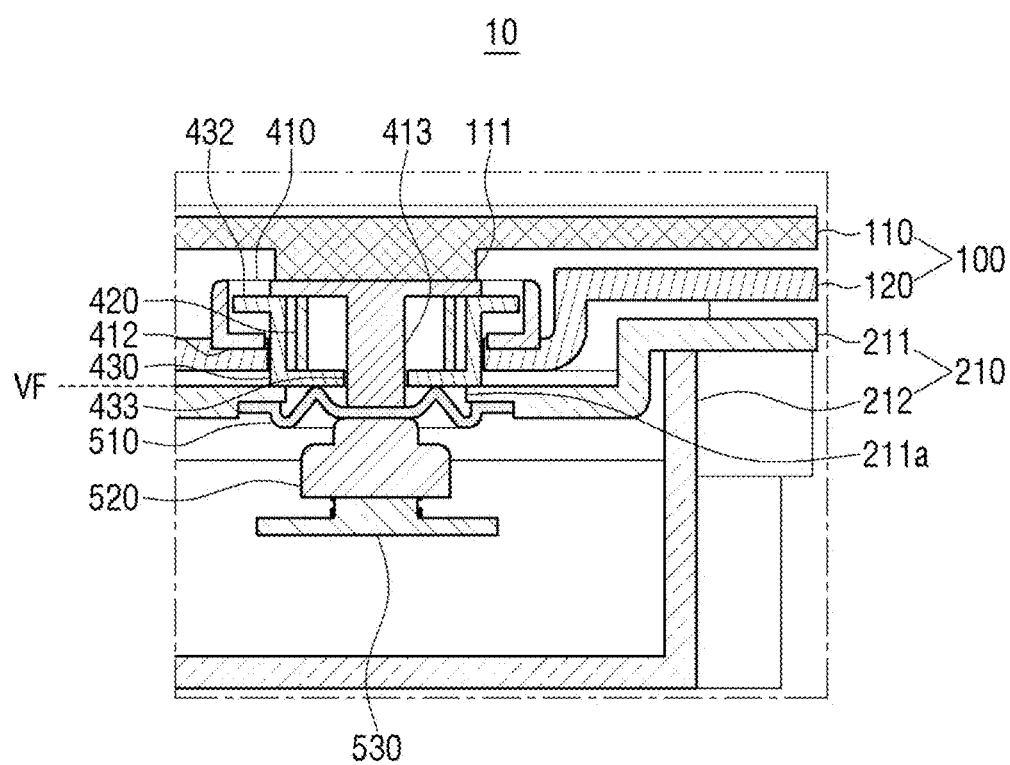
FIG. 14 is a view showing a charging port door in a compressed state.

FIG. 13 is a view showing a charging port door in an uncompressed state (e.g., a normal state or a base state), and FIG. 14 is a view showing a charging port door in a compressed state (e.g., a pressurized state or an activation state).

Referring to FIG. 13, the switch 530 of the charging port door 10 may remain unpressed in the uncompressed state. In the uncompressed state, the elastic force of the spring 420 may cause the spring cover 430 and the trigger 410 to be pushed in opposite directions and remain spaced apart. The spring cover 430 may be seated on the housing rim 210, and the trigger 410 may maintain a contact with the protrusion portion 111 of the outer panel 110 by the elastic force of the spring 420. At this time, since no pressure is applied to the switch 530, the switch 530 may transmit no control signal.

The spring cover 430 may be seated on a seating surface formed by the upper housing rim 211 and the sealing member 510. The sealing member 510 may seal the housing aperture 211a formed in the upper housing rim 211. The surface of the sealing member 510 and the surface of the upper housing rim 211 may be on the same virtual surface VF. The seating surface, on which the spring cover 430 is seated, may be a part of the virtual surface VF that includes the surface of the sealing member 510. Since the diameter of the spring cover 430 is larger than the diameter of the housing aperture 211a, the spring cover 430 may be seated on the seating surface without penetrating the housing aperture 211a.

Since the surface of the sealing member 510 and the surface of the upper housing rim 211 are on the same virtual surface VF, even if the door panel 100 is detached from the housing rim 210, the aesthetics of the surface of the housing rim 210 may not be impaired. In addition, even if the door panel 100 moves to the housing rim 210 and the spring cover 430 is seated on the seating surface, it may be prevented from applying pressure to the switch 530 by the spring cover 430.

Referring to FIG. 14, the switch 530 of the charging port door 10 may be pressed in the compressed state. When the external pressure is greater than the elastic force of the spring 420, the trigger 410 may be moved by being pushed by the outer panel 110. In turn, the stud 413 of the trigger 410 may protrude from the cover aperture 433 of the spring cover 430 and may push the sealing member 510. As the sealing member 510 is pushed by the stud 413 of the trigger 410, the sealing member 510 may be deformed to allow the stud 413 to penetrate the housing aperture 211a of the upper housing rim 211 and push the pressure delivering member 520. As the pressure delivering member 520 is pushed, the pressure delivering member 520 may push the switch 530. Accordingly, the switch 530 may be operated by the pressure to transmit a control signal.

Accordingly, a user may input a user command by pushing the outer panel 110. As the outer panel 110 is pushed, the switch 530 may transmit a control signal to the actuator 300. After inputting the user command, the user may remove or alleviate the pressure input from the outer panel 110. In response, the trigger 410 may move away from the spring cover 430 by the restoring force of the spring 420 and the sealing member 510. Accordingly, the door panel 100 may move, being pushed by the trigger 410, and the charging port door 10 may be converted to the uncompressed state.

The position of the door panel 100 in the uncompressed state and the position of the door panel 100 in the compressed state may be determined by the spring cover 430 and the trigger 410. In other words, the movement range of the door panel 100 may be determined by the spring cover 430 and the trigger 410. In addition, the force of the spring 420 to push the door panel 100 with respect to the housing rim 210 may be constantly maintained. Accordingly, even if the opening and closing operation of the door panel 100 is repeated multiple times, the movement range of the door panel 100 may remain unchanged, and the user may input a user command by pushing the door panel 100 with a constant force. Therefore, the same feeling of motion may be continued to be provided to the user.

Figure 15:
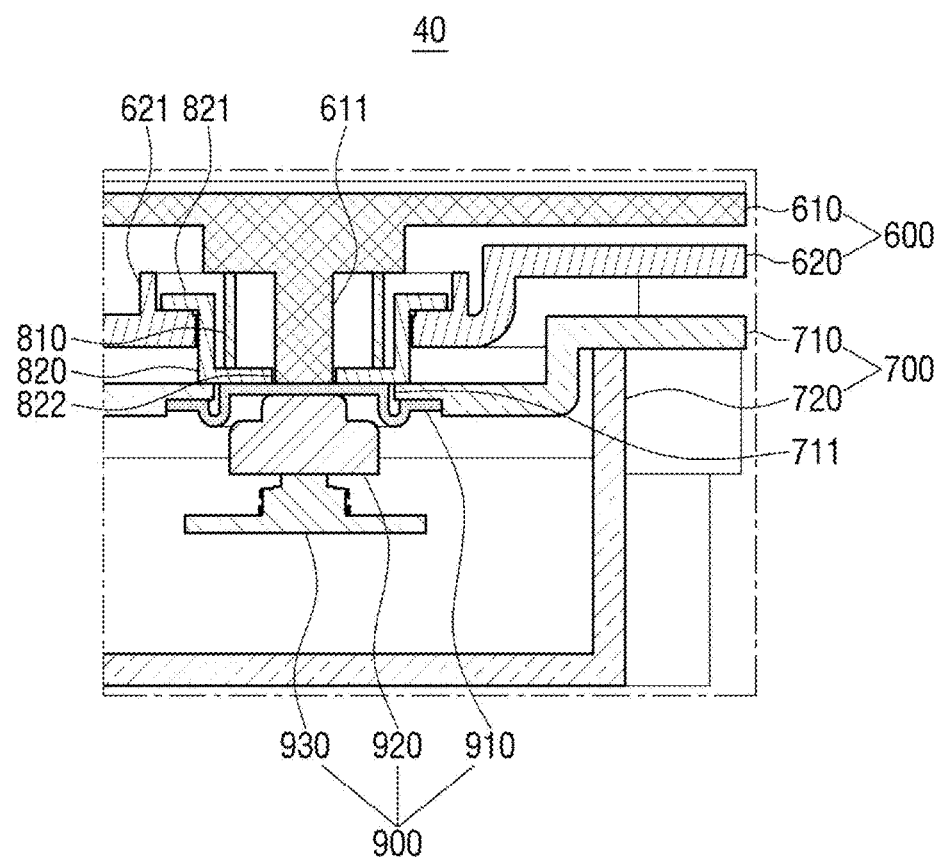
FIG. 15 is a view showing a charging port door according to another embodiment of the present disclosure.
Figure 16:
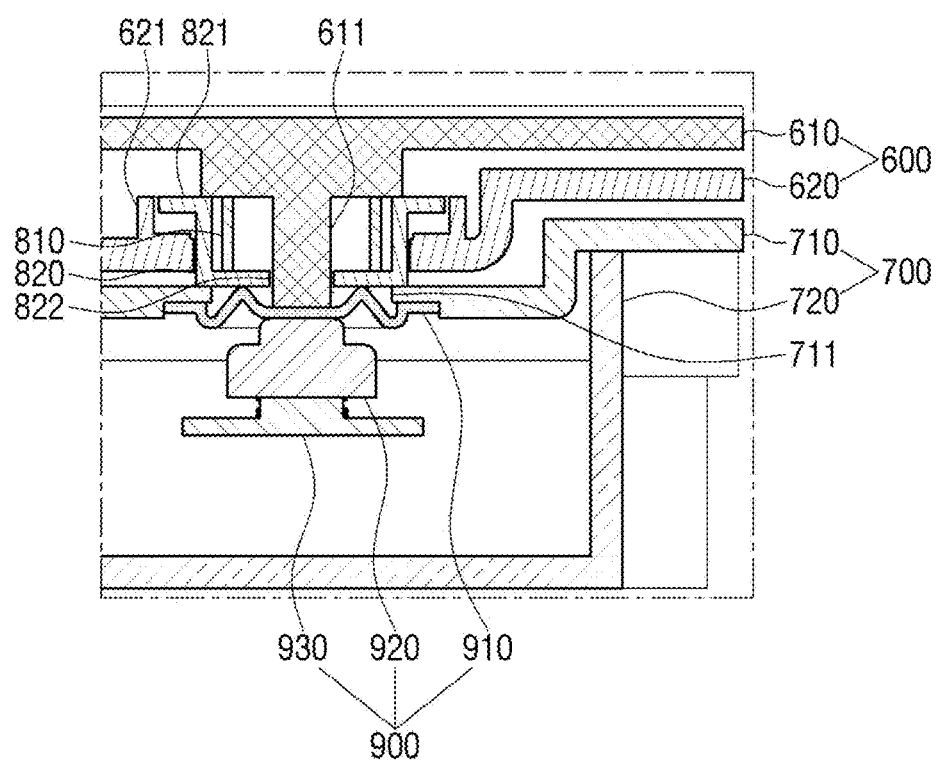
FIG. 16 is a view showing a pressure state of the charging port door shown in FIG. 15.

FIG. 15 is a view showing a charging port door according to another embodiment of the present disclosure, and FIG. 16 is a view showing a compressed state of the charging port door shown in FIG. 15. Referring to FIGS. 15 and 16, the charging port door 40 according to another embodiment of the present disclosure may include a door panel 600, a spring 810, a spring cover 820, a housing rim 700, and a switch unit 900.

The door panel 600 may include an outer panel 610 and an inner panel 620. The housing rim 700 may include an upper housing rim 710 and a lower housing rim 720. The switch unit 900 may include a sealing member 910, a pressure delivering member 920, and a switch 930. Since the outer panel 610, inner panel 620, spring 810, spring cover 820, upper housing rim 710, lower housing rim 720, sealing member 910, pressure delivering member 920, and switch 930 have substantially the same or similar shape and function as the aforementioned outer panel 110, inner panel 120, spring 420, spring cover 430, upper housing rim 211, lower housing rim 212, the sealing member 510, the pressure delivering member 520, and the switch 530, only the differences will be mainly described below.

The inner panel 620 may be engaged to be movable with respect to the spring cover 820. To this end, the inner panel 620 may include a locking member 621. A locking protrusion 821 of the spring cover 820 may be engaged with the locking member 621 of the inner panel 620. The spring cover 820 and the inner panel 620 may be engaged with each other to limit the movement range of the door panel 600. The spring cover 820 and the inner panel 620 may be coupled to each other to be movable relative to each other. In this embodiment, the trigger 410 of the previously described trigger unit 400 may be understood to be integrated with the outer panel 610.

Referring to FIG. 16, when the outer panel 610 and the inner panel 620 move with respect to the spring cover 820 by an external pressure, the stud 611 provided on the outer panel 610 may press the switch 930. When the external pressure is greater than the elastic force of the spring 810 in the compressed state, the stud 611 provided in the outer panel 610 may move. Subsequently, the stud 611 of the outer panel 610 may push the sealing member 910 while penetrating the cover aperture 822 of the spring cover 820. As the sealing member 910 is pushed by the stud 611 of the outer panel 610, the stud 611 may penetrate the housing aperture 711 of the upper housing rim 710 and push the pressure delivering member 920. As the pressure delivering member 920 is pushed, the pressure delivering member 920 may push the switch 930. Accordingly, the switch 930 may be operated by the pressure to register a control signal.

After inputting a user command by pushing the outer panel 610, the user may remove or alleviate the force input from the outer panel 610. In response, the stud 611 may move away from the spring cover 820 by the elastic force of the spring 810 and the sealing member 910. Accordingly, the entire door panel 600 may move together with the stud 611, and the charging port door 40 may return to the uncompressed state.

Those or ordinary skill in the art will appreciate that many variations and modifications can be made to the exemplary embodiments described herein without substantially departing from the principles of the present disclosure. Therefore, the exemplary embodiments of the disclosure are used for description purposes only and not for limiting the disclosure.

What is claimed is:

1. A charging port door assembly, comprising:
   a housing rim configured to be fixed to a vehicle;
   a switch disposed in the housing rim, wherein the switch transmits a control signal when pressed;
   a door panel configured to open or close the housing rim based on the control signal;
   a spring cover coupled to the door panel and exposed toward the housing rim;
   a trigger coupled to the spring cover and configured to move relative to the spring cover; and
   a spring coupled between the trigger and the spring cover to bias the trigger in a direction away from the housing rim,
   wherein, in response to an external pressure being applied to the door panel, the door panel causes the trigger to protrude out with respect to the spring cover toward the housing rim, with the spring cover being seated on the housing rim, and causes the switch to be pressed.

2. The charging port door assembly of claim 1, wherein the spring cover and the trigger are engaged to restrict a movement range of the door panel.

3. The charging port door assembly of claim 1, wherein the housing rim comprises:
   an upper housing rim disposed toward the door panel; and
   a lower housing rim coupled to the upper housing rim to provide an accommodation space for the switch,
   wherein the upper housing rim includes a housing aperture to allow movement of a stud provided in the trigger therethrough.

4. The charging port door assembly of claim 3, further comprising:
   a sealing member made of a material deformable by a pressure applied via the stud, wherein the sealing member seals the housing aperture.

5. The charging port door assembly of claim 4, wherein the spring cover is seated on a seating surface formed by the upper housing rim and the sealing member.

6. The charging port door assembly of claim 5, wherein a surface of the sealing member and a surface of the upper housing rim are disposed on a same virtual surface, and
   wherein the seating surface includes a portion of the virtual surface including the surface of the sealing member.

7. The charging port door assembly of claim 4, further comprising:
   a pressure delivering member disposed between the sealing member and the switch to transmit the pressure from the stud to the switch.

8. The charging port door assembly of claim 1, wherein the door panel comprises:
   an outer panel for receiving the external pressure; and
   an inner panel disposed toward the housing rim and coupled to the outer panel,
   wherein the spring cover is movable with respect to the inner panel.

9. The charging port door assembly of claim 8, wherein a stud included in the trigger provided on the outer panel presses the switch in response to the outer panel and the inner panel moving with respect to the spring cover by the external pressure.

10. The charging port door assembly of claim 1, wherein the switch transmits an open signal and a close signal alternatingly each time the switch is operated.

* * * * *